United States Patent

Sassmannshausen et al.

[11] Patent Number: 5,570,968
[45] Date of Patent: Nov. 5, 1996

[54] PUSH BUTTON LEVER CLAMPING DEVICE FOR TELESCOPING MEMBERS

[75] Inventors: Werner Sassmannshausen, Bad Berleburg-Berghausen; Werner Sassmannshausen, Bad Berleburg-Wingeshausen; Anke Kleindienst, Bad Berleburg, all of Germany

[73] Assignee: Sonor Johs. Link GmbH, Bad-Berleburg, Germany

[21] Appl. No.: 343,610

[22] PCT Filed: Mar. 18, 1994

[86] PCT No.: PCT/EP94/00861

§ 371 Date: Dec. 13, 1994

§ 102(e) Date: Dec. 13, 1994

[87] PCT Pub. No.: WO94/23215

PCT Pub. Date: Oct. 13, 1994

[30] Foreign Application Priority Data

Mar. 30, 1993 [DE] Germany .................. 43 10 355.3

[51] Int. Cl.[6] .................................................. F16B 7/10
[52] U.S. Cl. .................. 403/109; 248/188.5; 248/414; 403/326; 403/330; 403/377
[58] Field of Search ................... 248/188.5, 411, 248/414; 403/109, 110, 320, 321, 322, 325, 326, 330, 374, 377, 378

[56] References Cited

U.S. PATENT DOCUMENTS

| | | | |
|---|---|---|---|
| 1,447,519 | 3/1923 | Schade | 403/105 |
| 2,703,691 | 3/1955 | Minnis | 248/188.5 X |
| 4,367,971 | 1/1983 | Coren | 403/330 |
| 4,502,807 | 3/1985 | Salice | 403/330 X |

FOREIGN PATENT DOCUMENTS

| | | | |
|---|---|---|---|
| 1443259 | 5/1966 | France . | |
| 3000536 | 7/1981 | Germany . | |
| 667705 | 6/1979 | U.S.S.R. | 403/322 |

Primary Examiner—Blair Johnson
Assistant Examiner—Andrea Chop
Attorney, Agent, or Firm—Friedrich Kueffner

[57] ABSTRACT

In order to simplify the design of a clamping device (1), in particular for securing an axially displaceable rod (3) in optional adjustment positions, in which a rolling body (17) is supported at a housing (5) enclosing it for clamping purposes, the rolling body (17) is arranged in a lever head (9) of a lever (6) having at its end remote of the lever head (9) a push button (11) which is guided out through the housing (5) and the rolling body (17) contacts a portion of the wall of the housing (5) constructed on its inner side as an oblique plane (19).

6 Claims, 2 Drawing Sheets

PUSH BUTTON LEVER CLAMPING DEVICE FOR TELESCOPING MEMBERS

BACKGROUND OF THE INVENTION

1. Field of the Invention

The invention is directed to a clamping device, in particular for securing an axially displaceable rod in optional adjustment positions, in which the object or rod to be clamped is clamped by a rolling body supported at a housing enclosing it. It will be understood that, alternatively, in kinematic reversal, the clamping device could be disengaged and then displaced and secured relative to the object or rod. Such clamping devices serve, for example, to secure a tripod, supporting leg or the like support or holder or add-on part for devices, in particular musical percussion instruments, in optional attitudes and positions.

2. Description of the Related Art

Clamping devices on percussion instruments are exposed to considerable impactlike loading whether used to secure the position of legs which are adjustable in length or to hold instrument parts in a vertically adjustable manner, e.g., the movable cymbals of a high hat. Moreover, the natural vibrations of the instrument persist for a long time after a blow delivered to the clamping device. The parts connected by the clamping device must therefore be capable of being securely fastened in position relative to one another in order to prevent any change in position during playing which would require readjustment. DE-30 00 536 A1 describes a clamping device for securing optional adjustment positions of a holding member on percussion instruments which is guided on a bar or the like so as to be displaceable coaxially thereto, in particular for holding cymbals, high hats, drums, etc. so as to be vertically adjustable. This holding member has a chamber with opposing inclined walls which encloses the bar and narrows in diameter in the direction of load. The rolling bodies which produce the clamping action and have at least cylindrical portions are arranged between the inner wall of the chamber and the bar. The central region of the rolling bodies is adapted to the profile shape of the bar which can have, e.g., a round, hexagonal or octagonal cross section. An adjusting screw which can be screwed into the housing and is provided with a knurled head acts on a plate arranged above the rollers and a lower plate arranged below the rollers is supported on a pressure spring.

SUMMARY OF THE INVENTION

The object of the present invention is to provide a simpler design of the clamping device of the generic type.

This object is met, according to the invention, in that the rolling body is arranged in a lever head of a lever having, at its end remote of the lever head, a push button which is guided out through the housing and the rolling body contacts a portion of the housing wall constructed on its inner side as an oblique plane. The invention is based on the insight that the clamping action can be canceled simply by pressing down the end of the lever remote of the lever head and that a reliable clamping of the axially displaceable rod or clamping device which fully satisfies requirements can be achieved by the self-locking which is effected at the oblique plane after the lever end is released.

In a construction of the invention, the lever is formed by two parallel arms which are connected with one another by a crosspiece of the lever head at one end and by the push button arranged at the other end of the arms in a diagonal position relative to the crosspiece. The push button, which can advantageously receive within its inner chamber a pressure spring supported against the rod, projects out of the housing. When the user depresses the push button against the force of the pressure spring, the self-locking brought about at the oblique plane by the opposing force of the pressing force is canceled, whereupon the necessary adjusting movements can be carried out. When the desired adjustment position is achieved, the push button need only be released to restore the self-locking contact of the rolling body at the oblique plane as a result of the layout of forces.

The lever head is advisably supported so as to be swivelable on axles arranged in the opposite housing walls. When the lever is inserted in the housing, which is advantageously open on the side remote of the push button for this purpose, the axles can be inserted through housing bore holes into opposite bore holes in the two arms of the lever.

The rolling body is advisably inserted loosely in recesses of the arms of the double-arm lever, which recesses are open at the top. The rod which is inserted into the housing below the push button and between the rolling body and the crosspiece of the lever head—this housing having through-openings in the appropriate portions of its wall—is accordingly in rolling contact with the rolling body contacting the oblique plane of the inner wall of the housing.

Further features and advantages of the invention are contained in the claims and in the following description in which an embodiment example of the subject of the invention is explained more fully.

DESCRIPTION OF THE PREFERRED EMBODIMENTS

Figure 1:
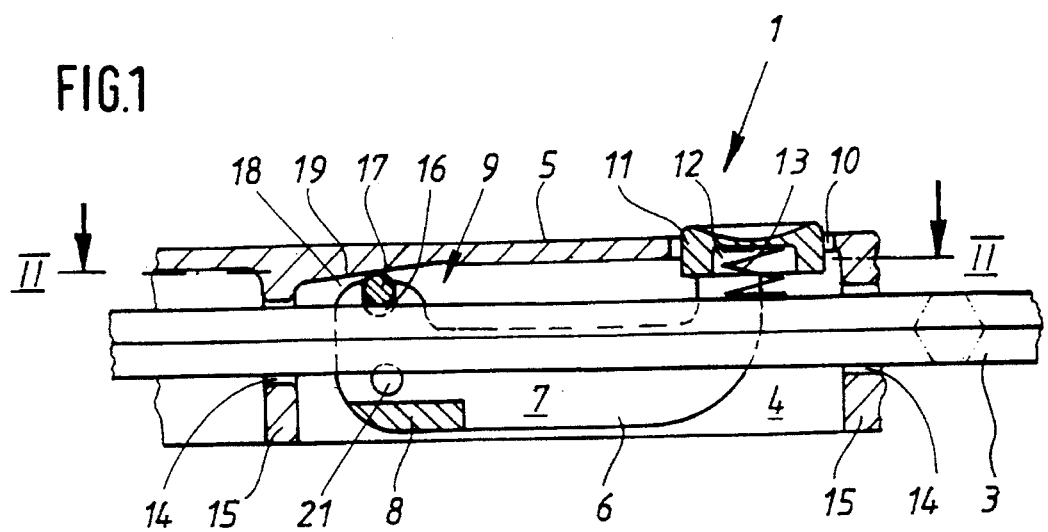
FIG. 1 shows a cross section of the clamping device according to the invention in the clamped state.

A clamping device 1 for setting optional adjustment positions of a rod 3, which is movable in either direction indicated by the double arrow 2 (see FIGS. 3 and 4) and has a hexagonal cross section, has a double-arm lever 6 arranged in a housing chamber 4 of a housing 5.

The two arms 7 which extend parallel to one another are interconnected at one end by a crosspiece 8 and form a lever head 9 in this location. At their other end, the arms 7 are connected by a cylindrical push button 11 which projects out through a housing opening 10 and is situated diagonally with respect to the crosspiece 8. A pressure spring 13 which is received in an inner chamber 12 of the push button 11 is supported by its free end on the rod 3 which is inserted through openings 14 in the housing walls or supporting walls 15 coaxially to the housing 5 so that a slight braking action is exerted on the rod 3. Accordingly, the rod 3 cannot move in the axial direction as a result of its own weight. The lever head 9 has open recesses 16 at its upper ends remote of the crosspiece 8, a cylindrical rolling body 17 being placed loosely therein (compare FIG. 2). The rolling body 17 contacts a wall portion of the housing 5 constructed as an oblique plane 19. In the clamping position shown in FIG. 1, the pressure spring 13 exerts an outwardly directed force on the push button 11. The opposing force of the push button 11 brings about a self-locking at the oblique plane 19 of the housing wall such that the rolling body 17 clamps the rod 3 so as to prevent movement.

Figure 2:
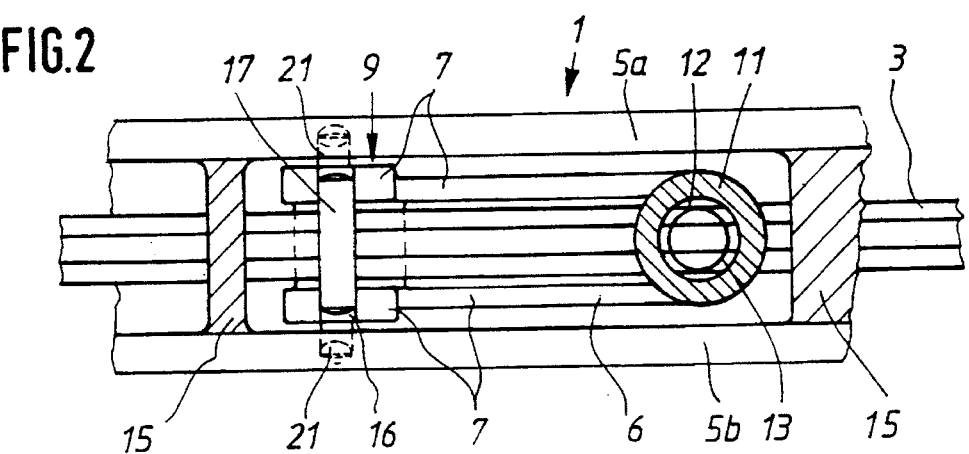
FIG. 2 shows a top view of the clamping device according to FIG. 1 in section along line II—II.
Figure 3:
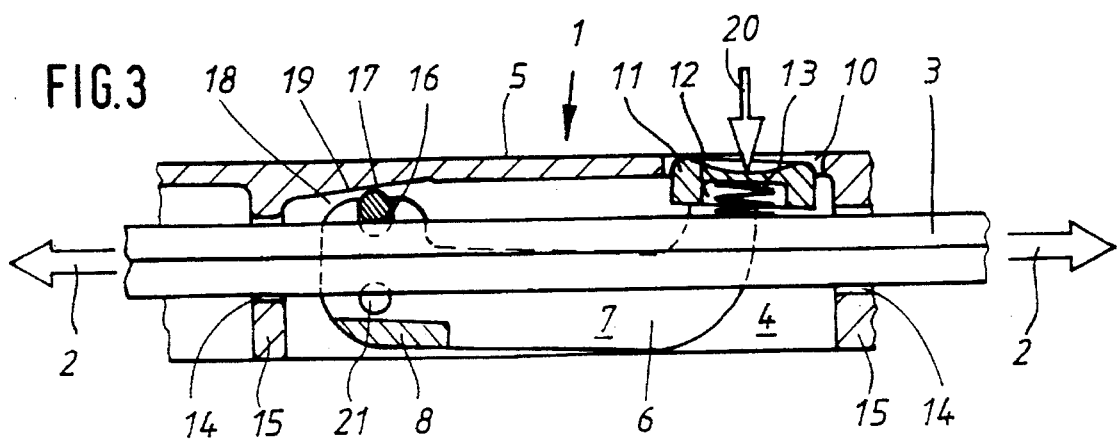
FIG. 3 is a view of the clamping device corresponding to FIG. 1 in the disengaged state.

To release the clamping, the push button 11 is depressed into the housing 5 in the direction of arrow 20—as shown in FIG. 3—against the force of the pressure spring 13 so that the double-arm lever 6 swivels about axles 21. These axles 21 are arranged in opposite walls 5a, 5b of the housing 5 (see FIG. 2) and project into recesses which are provided in the thickened ends of the arms 7 of the lever 6 at the lever head 9. When this swiveling takes place, the self-locking at the oblique plane 19 is canceled so that the rolling body or roller 17 is released and the rod 3 is freed for axial displacement into a desired adjustment position. When the adjustment position is achieved, the push button 11 need only be released, whereupon the clamping state shown in FIG. 1 is automatically assumed.

Figure 4:
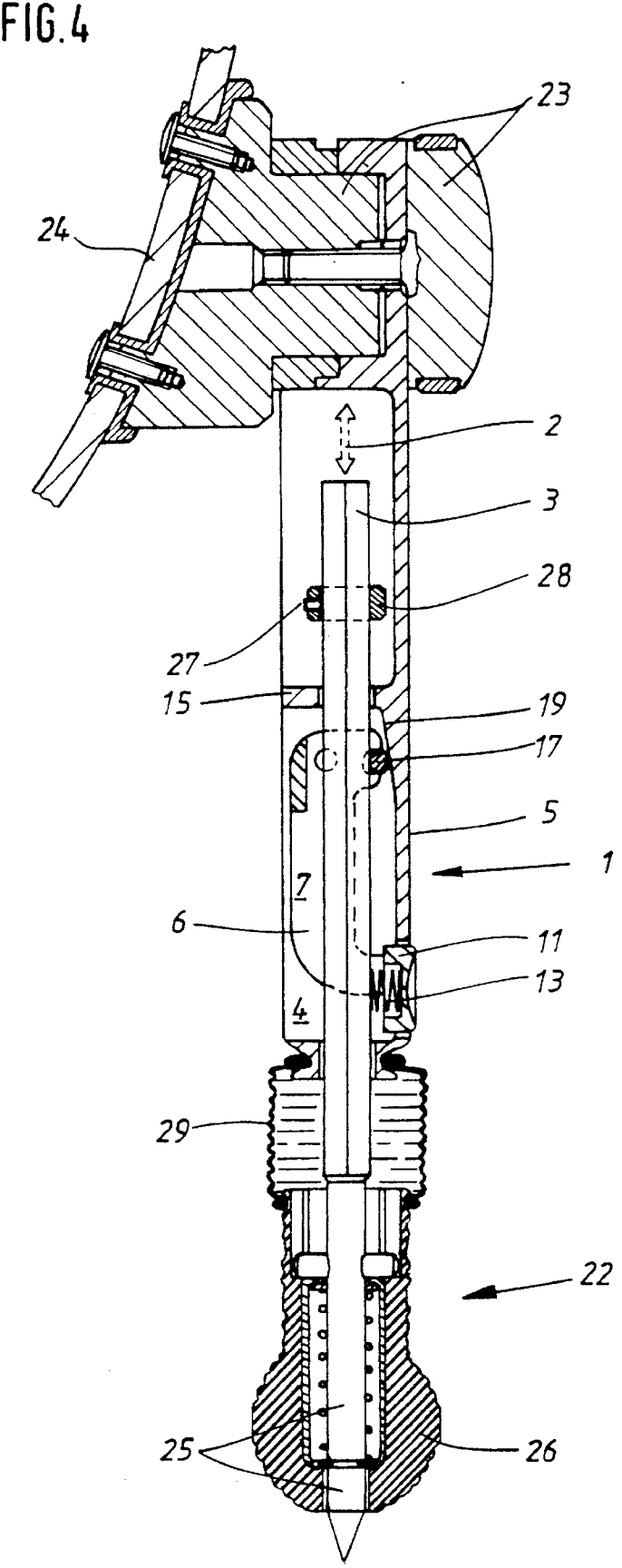
FIG. 4 shows the clamping device according to the invention as an integrated component part of a bass drum tip of a drum which is not shown in detail.

FIG. 4 illustrates the use of the clamping device 1 in a bass drum tip 22 which is fastened through a holder 23 the resonator shell 24 of a bass drum which is not shown in more detail. In this instance, the support leg or bass drum tip 22 at the same time forms the housing 5, whose side facing the rolling body 17 is constructed as an oblique plane 19, and the rod 3 is provided at its free end with a point 25 which ensures a reliable support of the set up bass drum. By means of a rubber foot 26 which is displaceable relative to the rod 3 and point 25, this point 25 can be retracted into the rubber foot 26 in a protected position, as distinct from the view shown in FIG. 4, without having to loosen the clamping device 1 and displace the rod 3 and point 25 for this purpose. However, if a lengthening or shortening of the bass drum tip 22 as a whole is required, it is necessary to loosen the clamping device 1 in the manner described above so that the rod 3 can be displaced axially in the appropriate direction corresponding to the double arrow 2. An adjustable stop ring 28 which can be secured in a desired position by a screw 27 is arranged on the rear end of the rod 3 remote of the point 25 for the purpose of defining the adjustment path for lengthening the bass drum tip 22. An accordion sleeve or bellows 29 arranged between the rubber foot 26 and the housing 5 of the bass drum tip 22 encloses the end of the rod 3 projecting out of the housing 5 and automatically adapts to changes in length.

We claim:

1. A clamping device securing an axially displaceable rod in optional adjustment positions, the clamping device comprising a housing having an interior, wherein the rod extends through the housing, and a lever having first and second ends, a push button extending outwardly through the housing attached to the first end of the lever, means for biasing the push button out of the interior of the housing, and a rolling body mounted on the second end of the lever, the interior of the housing having an inclined wall portion, wherein the rolling body contacts the inclined wall portion, such that the inclined wall portion acts to clamp the rolling body against the rod for locking the rod.

2. The clamping device according to claim 1, wherein the lever comprises two parallel arms, the arms being connected to one another through a crosspiece at the second end of the lever and through the push button at the first end of the lever, wherein the push button extends diagonally relative to the crosspiece.

3. The clamping device according to claims 1 or 2, wherein the housing has opposite housing walls, further comprising axles extending between the opposite housing walls, wherein the second end of the lever is mounted so as to be swivelable on the axles.

4. The clamping device according to claim 1, wherein the second end of the lever has outwardly open recesses, wherein the rolling body is loosely received in the recesses.

5. The clamping device according to claim 1, wherein the push button has an inner chamber, wherein the means for biasing the push button is a pressure spring mounted in the inner chamber and contacting the rod.

6. The clamping device according to claim 1, wherein the housing is open at a side thereof facing away from the push button.

* * * * *